United States Patent Office 3,494,976
Patented Feb. 10, 1970

3,494,976
PREPARATION OF POLYENES BY PYROLYSIS OF HALOETHER-ADDUCT IN STEAM
Joe T. Kelly, Littleton, Colo., and David W. Hall, Vancouver, British Columbia, Canada, assignors to Marathon Oil Company, Findlay, Ohio, a corporation of Ohio
No Drawing. Filed Aug. 27, 1968, Ser. No. 755,712
Int. Cl. C07c 1/26, 1/20, 1/00
U.S. Cl. 260—681
15 Claims

ABSTRACT OF THE DISCLOSURE

The invention involves a process for the production of polyenes by the pyrolysis of halo-substituted ethers wherein the pyrolysis is carried out in the vapor phase in the presence of steam. The reaction products of the pyrolysis step are the desired polyene product, hydrogen halide and an alcohol. By carrying out the pyrolysis reaction in the vapor phase in the presence of steam, the unwanted side reactions of the alcohol and hydrogen halide to form alkyl halides and tar formation are reduced.

BACKGROUND OF THE INVENTION

In application Ser. No. 458,432 to D. W. Hall et al., filed May 24, 1965, now U.S. Patent No. 3,360,583, there is described a process for the preparation of polyene compounds including the step of pyrolyzing or splitting a haloether olefin adduct to form a polyene compound. Briefly, this method comprises reacting a hydrogen halide, an alcohol and an aldehyde to form a haloether. The haloether is then reacted with an olefinic compound to produce an adduct. This adduct is then subjected to pyrolysis to produce hydrogen halide, an alcohol and a polyene. While this process represents a significant improvement over the prior art processes for the production of polyenes, there are several drawbacks associated with this process. During the final pyrolysis step, large quantities of the alcohol and hydrogen halide produced react to form alkyl halides. It would be highly desirable to recover the alcohol and hydrogen halide components for recycle to the initial step of preparing the haloether starting material. The recovery of alkyl halide from the reaction mixture and its conversion to the alcohol and hydrogen halide has proved to be difficult and expensive, however.

In addition, the formation of tarry residues during the pyrolysis step lowers the yield of pure polyene.

It is an object of the present invention to suppress the side reaction between the hydrogen halide and alcohol produced during the pyrolysis step described above to form alkyl halides, thereby enhancing the recovery of hydrogen halide and alcohol for recycle.

It is a further object of the present invention to reduce the formation of tarry residues and other impurities during the above-described pyrolysis step.

Copending application Ser. No. 775,739 filed on the same day as this application also relates to the general subject matter of this application.

BRIEF DESCRIPTION OF THE INVENTION

Briefly, the present invention contemplates carrying out the pyrolysis of the haloether-olefinic adduct in the vapor phase in the presence of steam. Applicants have found that conducting the pyrolysis step in this manner reduces the formation of alkyl halides and tarry residues and other impurities, thereby enhancing the recovery of the desired polyene product and the hydrogen halide and alcohol reactants which may then be recycled for use in forming the haloether.

DETAILED DESCRIPTION OF THE INVENTION

Reference may be had to U.S. Patent 3,360,583 for the details of the overall process for the preparation of polyenes.

The initial step in the process comprises, as a preferred method, reacting hydrogen halide, an alcohol and an aldehyde to form a haloether. The reaction conditions for this step are not overly critical. Generally, the reaction may be carried out at temperatures ranging from about $-20°$ C. to about $+35°$ C. Although not necessary, it is preferred to employ an excess of hydrogen chloride to insure complete reaction.

Other methods for producing the haloethers are known. See, for example, L. Summers, Chem. Rev., vol. 55, p. 301 (1955).

The resulting haloether is subsequently reacted with a reactive olefin to form an adduct. Generally, this reaction is carried out in the liquid phase. The reaction conditions are not overly critical, however, the reaction proceeds generally well at $-30$ to $70°$ C., preferably, from about 5 to about $35°$ C. The gaseous olefin may be sparged through the liquid haloether. As suitable solvents may be mentioned the chloroalkanes, e.g., carbon tetrachloride and dichloroethane, and alkane ethers such as diethyl ether, etc.

The reaction between the haloether and olefin is carried out in the presence of a catalyst, preferably, a Friedel-Crafts catalyst. The most preferred Friedel-Crafts catalysts are the metallic halides, such as zinc chloride, titanium tetrachloride, aluminum chloride, zirconium tetrachloride, ferric chloride and mercuric chloride. It is to be understood, however, that other metal halides can be used and any Friedel-Crafts catalyst is suitable for this reaction.

For a more detailed description of the reaction to form the adduct, reference may be had to H. Gross, Angewandte Chemie, International English Ed., vol. 6, No. 4, p. 335, April 1967.

The haloether adduct is subsequently cleaved to form the desired conjugated polyene. As indicated above, the cleavage or pyrolysis step is carried out in the vapor phase in the presence of steam. It is preferred to carry out the cleavage step in the presence of a catalyst, suitably, an acidic catlyst. Although any of the catalysts described in U.S. Patent 3,360,583 may be employed, it is preferred to carry out the pyrolysis step in the presence of the acidic oxide cracking catalyst, such as silica-alumina, silica-magnesia, natural clays, bauxite, etc. Metal oxide catalysts of the type used in dehydro-halogenation reactions may also be used. Among the more preferred catalysts are the crystalline zeolites or molecular sieves. Especially preferred among these are the acid-resistant forms of Type Y molecular sieves.

Particularly suitable crystalline zeolite or molecular sieve catalysts are those whose structure and composition render them particularly impervious to aqueous hydrogen halide. Catalysts not possessing these characteristics, although capable of promoting polyene formation, are not economically practical. It has been found that the Y type catalysts are preferred over the X type catalysts. For a more detailed description of suitable crystalline zeolite or molecular sieve catalysts, see Oil and Gas Journal, May 17, 1965, pages 91–95.

Although not necessary, it is sometimes desirable to impregnate the catalyst with various promoters. Suitable promoters are $ZnCl_2$, $CuCl_2$, LiCl, LiBr, HCl, LiF and the like. Alternately, the catalysts may be diluted with inert packing, e.g. carbodundum. The catalyst and packing may be positioned in a column and the reactants passed concurrently or countercurrently through the packed catalyst.

The vapor phase reaction may be carried out in any convenient manner. The haloether-olefin adduct may be mixed with a suitable amount of water and vaporized in a pre-heating zone and then passing the vapor over the catalyst to effect cleavage. Alternately, the feed materials may be vaporized in the pyrolysis zone itself. It will be understood by those skilled in the art that any method generally acceptable for vapor phase type reactions may be utilized to effect cleavage of the haloether-olefin adduct. It will also be understood by those skilled in the art that any suitable apparatus generally acceptable for vapor phase type operations may be employed.

The ratio of adduct feed material to catalysts is not overly critical. In units of weight hourly space velocity, preferred values are from 0.1 to 10 more preferably 0.5 to 1.3. It will be apparent to those skilled in the art that the space velocity to be employed will depend on the nature of the haloether-olefin adduct feed, catalyst, amount of steam diluent, temperature, etc.

The amount of steam diluent employed is not critical. The ratio of steam to adduct feed may range from about 0.1 to about 100 parts by weight of water per part of adduct feed material, preferably, from about 0.5 to 3.0. The ratio of alkyl halide to alcohol formed can be regulated within limits to any specified level by varying the amount of steam diluent used.

The pressures and temperatures employed during the pyrolysis step are not critical. Obviously, reaction conditions must be employed which will insure a vapor phase operation. The particular conditions employed in a specific case will depend on the feed material, space velocity, etc. Generally, pressures ranging from about 0.1 to about 10 atmospheres, preferably from about 0.5 to about 3.0 atmospheres may be employed. Generally, normal atmospheric pressure gives excellent results. The cleavage temperature employed obviously will depend on the above-noted variables. Generally, the process may be carried out from 75° C. to about 500° C., preferably, from about 150° C. to about 350° C. Employing the preferred catalysts noted above and employing a 1:1 ratio of steam to adduct feed material, satisfactory operating temperatures may range from 250° C. to 300° C.

The polyene product, hydrogen halide and alcohol may be recovered by any suitable method. It will be appreciated by those skilled in the art that any recovery method suitable for recovering products from vapoh phase type operation may be employed. Suitably, the product vapors, including the steam, may be processed in a water scrubber. The hydrogen halide and alcohol are recovered from the scrub water and excess water in the scrubbing operation may be converted to steam for recycle to the cleavage step. Non-volatile organic materials, such as excess haloether-olefin adduct feed may be condensed during the water scrubbing operation and removed as a separate liquid phase and recycled. The volatile components, such as the desired polyene product and the small amounts of alkyl halides formed by the reaction of portions of the hydrogen halide and alcohol may either be condensed in the water scrubber or entrained in a diluent gas such as nitrogen or steam, etc. and condensed in a subsequent receiver.

The cleavage step of the present invention is applicable for the pyrolysis of any haloether-olefin adduct to form the corresponding polyene, hydrogen halide and alcohol. Generally, any of the haloether-olefin adducts described in U.S Patent 3,360,583 may be employed. Generally, any alpha-haloether may be employed for the adduct formation. The alpha-monohalo lower alkane ethers, either symmetrical or asymmetrical, are preferred. Preferably, these haloethers are substituted in the alpha position with chloro, bromo or iodo substituents and are either methyl, ethyl or propyl ethers. Suitable symmetrical alpha-haloethers include bis(chloromethyl) ether, bis(alpha-bromoethyl) ether, bis(alpha-iodopropyl) ether, etc. Asymmetrical ethers include alpha, beta, dicholorodiethyl ether, dichloromethyl methyl ether, chloromethyldodecyl ether, chloromethyl p-chlorophenyl ether, alpha-bromoethyl ethyl ether, alpha-iodomethyl propyl ether, chloromethyl methyl ether, chloromethyl phenyl ether, etc. Cyclic ethers such as 2,5-dichlorotetrahydrofuran, alpha-phenyl-alpha-chloromethyl pyrocatechol and 2,3-dichlorotetrahydropyran, etc. may also be employed. Also suitable as a reactant is mono-chloroethylene carbonate. Reference may be had to the above cited Gross article for other suitable ethers.

The olefins suitable for forming the adduct material are any of the those described in U.S. Patent 3,360,583. Generally any reactive olefin not spatially or sterically hindered may be employed. It will also be understood that the term "olefin" includes not only unsaturated aliphatic hydrocarbons, but also, substituted unsaturated, aliphatic hydrocarbons, cyclo-aliphatic unsaturated hydrocarbons, etc. Suitable materials include the halogen-substituted olefins, preferably mono-halogen olefins wherein the halogen atom is contained on an olefinic carbon atom. Additionally, other halogen atoms may be substituted on other carbon atoms within the molecule. Aromatic hydrocarbon substituted olefins are also suitable. Moreover, aliphatic-substituted olefins are also suitable. Suitable olefins include allyl chloride; allyl bromide; 3-methyl-3-butenyl methyl ether; 2-fluoro-propene; butadiene; isoprene; 2-chloro-propene, cyclohexene; styrene; p-chlorostyrene; ethylene; 2-butene; propylene; 3-methyl-2-butene; 1-pentene; 2-pentene; 2-methyl-2-butene; 1,3-pentadiene; 2,3-dimethyl-1,3-butadiene; 2,3-dimethyl-2-butene; 1,3-cyclohexadiene; 2,4-hexadiene; 1-octene; cyclohexoethylene; allylbenzene; etc. Preferably, the olefins contain from 2 to 9 carbon atoms.

As noted above, by carrying out the pyrolysis step in the presence of steam in the vapor phase, the amounts of unwanted alkyl halide impurities produced during the pyrolysis step is greatly reduced. This significant reduction in the amount of alkyl halide produced enhances the recovery of hydrogen halide and alcohol which may be recycled to the process for the formation of the haloether material, thereby increasing the overall efficiency of the process. Moreover, by conducting the pyrolysis in the presence of steam in the vapor phase, the amounts of other impurities, such as tarry residues, are greatly reduced. One of the main components of these tars is by-product polymer formed by the polymerization of the polyene product. By carrying out the reaction in the vapor phase and employing a steam diluent, this side polymerization reaction is greatly reduced, thereby increasing the amount of recoverable desired product and eliminating significant amounts of the tarry residue. As a result, greater amounts of desired product are obtained.

It will also be appreciated by those skilled in the art that vapor phase operations are subject to easier control and are more efficient than corresponding liquid phase operations.

The invention will be illustrated by the following non-limiting examples:

Example I

This example involves the pyrolysis of 3-chloro-3-methyl butyl methyl ether (CMBME) to produce isoprene, methanol and hydrogen halide according to the following reaction.

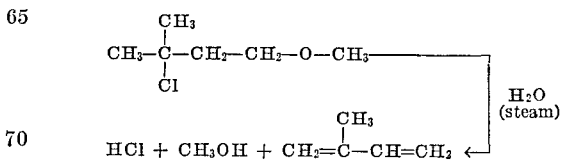

An apparatus for synthesizing chloromethyl methyl ether consisted of an upright tubular glass vessel 2″ in diameter and 18″ long and a stirrer extended to within ½″ of the bottom of the vessel with a bottom outlet and a cooling jacket. Near the top of the reactor is an outlet connected to a bubble-type, gas flow indicator device and to a Dry Ice trap. An additional opening in the top of the vessel served as an inlet for solid and liquid reagents. This inlet was sealed during runs.

The apparatus provides for thorough mixing of the reagents and separation of the aqueous and organic phases formed during the preparation of chloromethyl methyl ether. To the reactor was added paraformaldehyde (Matheson, minimum claimed $CH_2O$, 95%; found by actual analysis, 96%; 6.9 g. (2.14) moles), and methanol (Merck, reagent, 67.3 g., (2.12) moles). The mixture was stirred vigorously and cooled to 10° C. while gaseous HCl was introduced. After about one hour, the gas flow device attached to the exit tube indicated that HCl absorption had ceased.

The mixture was permitted to warm to room temperature, and stirring was discontinued to allow the two phases to separate. The lower aqueous phase, saturated with HCl and containing some methanol, formaldehyde and a very small amount of methylal, was drained into a tared flask containing a weighted amount of distilled water. The weight of this lower phase was 86.4 g.; it was found to contain 4.39 g. formaldehyde (this figure includes formaldehyde from all sources present in the solution such as, for example, methylal). The organic phase contained chloromethyl methyl ether (CME).

1.0 g. of zirconium tetrachloride catalyst was added to the CME phase and admixed with refinery butylene streams containing from about 5–25% isobutylene. This hydrocarbon feed is utilized in an amount such that the isobutylene therein is equal to or greater than (on a molar basis) the CME charged. The reaction is conducted at about 25° C. After a reaction period of sufficient duration to transform all of the CME present, the crude product is transferred from the reactor to a distillation tower where most of the excess hydrocarbon feed is flashed. The bottoms from the flash distillation are water washed to remove the metal halide catalyst.

The crude product contains 0–15% residuel $C_4$ hydrocarbons, 0–8% byproduct tert-butyl chloride, 0–3% unsaturated ether intermediates derived from the addition reaction produce, 40–75% CMBME, 0–5% 3-chloro-2-methylbutyl methyl ether, 0–1% 3-chloropentyl methyl ether, 0–3% of a mixture of di- and tri-isobutylene, and 9–20% of heavy byproducts, mainly composed of chlorinated ethers such as 1,5-dimethoxy-3-methyl-3-chloropentane. The crude product vapor is mixed with steam diluent just prior to entry into a column packed with Linde SK400 Y type molecular sieve catalyst. The ratio of steam to CMBME is one. The steam-CMBME mixture is passed through the catalyst at a space velocity of 1. The reaction temperature was maintained within the range of 275–300° C. at atmospheric pressure. The exit gas from the pyrolysis reaction contained the above-mentioned amounts of residual $C_4$ hydrocarbons enriched with isobutylene derived from the pyrolysis of t-butylchloride. In addition to the desired product, isoprene, the vapor also contained HCl split from all of the above-mentioned chlorine containing compounds. The vapor also contains methanol split from all feed compounds prossessing at least one methoxy group.

Also present in the exit vapor is a small amount of methyl chloride derived from the reaction between methanol and HCl in the pyrolysis reactor. Additional components in the effluent vapor are unsaturated ether intermediates derived from CMBME, 2-butene-CME adduct, 1-butene-CME adduct, and heavy chlorinated ether byproducts. Also present is 2-vinyl-1-3-butadiene derived from 1,5-dimethoxy-3-methyl-3-chloropentane.

The crude product vapor, still diluted with steam is passed into a scrubbing tank containing water. Methanol, HCl and steam are absorbed into the water layer. A side stream is taken from the water layer and the alcohol and HCl components recovered and recycled to the CME preparation step. A portion of the water from the side stream is vaporized and the steam recycled to the pyrolysis reactor. Residual $C_4$ hydrocarbons and methyl chloride pass through the water scrubber and are separated in a fractionating column. The isobutylene-enriched hydrocarbons may be passed to the CME addition reactor.

The small amounts of methyl chloride formed may be isolated and recycled where it is converted back to methanol and HCl for recycling to the CME preparation step, or may be sold.

The other components from the pyrolysis reactor effluent condense in the water scrubber and form an organic phase. The liquid organic phase is continually withdrawn from the scrubber and fractionated to obtain polymerization grade isoprene and small amounts of 2-vinyl-1-3-butadiene. All of the remaining components are recycled and combined with the crude product from the adduct formation step prior to entry of that material into the preheater section for vaporization and passage through the pyrolysis step.

The following examples are illustrative of the advantageous results produced by the present invention. In each case, the process described is identical to that in Example I except where noted in Table I.

TABLE I.—ISOPRENE BY PYROLYSIS OF CMBME OVER MOLECULAR SIEVE CATALYSTS [1]

| Example | Catalyst type | Space velocity [2] | Temp. (° C.) | Material balance (percent) | Mole percent yield | | | | | | Heavy oil yield (Wt. percent) | MeOH/MeCl |
| | | | | | Isoprene | Intermediate unsaturated ethers | Isoprene+ intermediate unsaturated ethers | HCl | MeOH | MeCl | | |
|---|---|---|---|---|---|---|---|---|---|---|---|---|
| II | SK-400 | 0.87 | 300 | 96.1 | 76.6 | 5.6 | 82.2 | 40.7 | 25.2 | 52.8 | 4.1 | 0.477 |
| III | SK-400 | 0.77 | 250 | 96.6 | 82.7 | 1 | 83.7 | 17.6 | 14.1 | 71.6 | 3.6 | 0.197 |
| IV | SK-400 | [3] 0.99 | 300 | 97.2 | 66.1 | 16.3 | 82.4 | 66.0 | 42.6 | 25.2 | 2.5 | 1.690 |
| V | SK-400 | [4] 0.80 | 350 | 98.0 | 85.0 | Trace | 85.0 | 66.0 | 44.0 | 23.1 | 2.0 | 1.957 |

[1] Linde SK-400 "Y" type, pellets size, 4–8 mesh.
[2] Weight of CMBME (or water) feed per weight of catalyst per hour.
[3] Water, 0.98.
[4] Water, 0.81.

As is apparent from the results shown in Table I, particularly in the column headed MeOH/MeCl, the employment of steam diluent in the vapor phase gives highly advantageous results. Thus, the ratio of methyl alcohol to the undesired methyl chloride is significantly higher in Example IV which was conducted in the presence of a steam diluent than in Examples II and III, wherein no steam was present. Moreover, the amounts of HCl produced in Examples IV and V are significantly higher than in the other examples. Moreover, the yield of heavy oil or tarry materials in Examples IV and V is significantly lower than in Examples II and III.

When a steam diluent is used, some of the adduct is hydrolyzed to higher unsaturated alcohols which ultimately are converted to the desired polyene product. The presence of these alcohols in the aqueous phase, however, often renders it difficult to precisely determine the amount of methyl alcohol present.

As a result of these advantages, greater amounts of alcohol and hydrogen halide are recoverable from the system, capable of being recycled to the initial reaction step, thereby contributing to the overall efficiency of the process. Moreover, due to the production of fewer impurities, a higher yield of polyene product is produced.

Again, it is emphasized that the present invention represents an improvement over that described in U.S.

Patent 3,360,583. The process of the present invention is not intended to be limited by the foregoing examples, but rather by the appended claims and is applicable to any and all processes disclosed in the above-noted U.S. patent.

What is claimed is:

1. In a process for the preparation of polyolefinic compounds by the pyrolysis of an olefin-haloether adduct to form a polyolefinic compound, hydrogen halide and alcohol, the improvement comprising carrying out said pyrolysis in the vapor phase in the presence of steam.

2. The process of claim 1 including the step of reacting a haloether and an olefinic compound to produce said adduct.

3. The process of claim 1 wherein said pyrolysis is carried out in the presence of a catalyst.

4. The process of claim 3 wherein said catalyst is an acidic catalyst.

5. The process of claim 3 wherein said catalyst is selected from the group consisting of crystalline zeolites and molecular sieves.

6. The process of claim 1 wherein the weight hourly space velocity of said olefin-haloether adduct is in the range of from about 0.1 to about 10.

7. The process of claim 1 wherein the weight ratio of steam to haloether-olefin adduct is in the range of from about 0.1 to about 100.

8. The process of claim 1 wherein the reaction pressure for the pyrolysis is in the range of from about 0.1 to about 10 atmospheres.

9. The process of claim 1 wherein the reaction temperature for pyrolysis is in the range of from about 75° to about 500° C.

10. The process of claim 2 wherein said haloether is a chloromethyl lower alkyl ether and said olefin is selected from the group consisting of hydrocarbon and halo-substituted olefins having from 2 to 9 carbon atoms.

11. The process of claim 10 wherein said haloether is chloromethyl methyl ether and said olefin is isobutylene and said polyolefinic compound is isoprene.

12. In a process for the preparation of polyolefinic compounds by forming a haloether, reacting said haloether with an olefinic compound to form a haloether adduct of said olefinic compound and splitting hydrogen halide and an alcohol from said adduct to form a polyolefinic compound, the improvement comprising carrying out said splitting step in the vapor phase in the presence of steam.

13. The process of claim 12 wherein said haloether is formed by reacting hydrogen halide, an alcohol and an aldehyde.

14. The process of claim 13 including the steps of separating said hydrogen halide and said alcohol from said polyolefinic compound, reacting said hydrogen halide and said alcohol with an additional amount of aldehyde to form at least a portion of said haloether starting material.

15. The process of claim 14 wherein said hydrogen halide is hydrogen chloride, said alcohol is methanol, said aldehyde is formaldehyde, said haloether is chloromethyl methyl ether, said olefin is isobutylene and said polyolefinic compound is isoprene.

References Cited

UNITED STATES PATENTS 3,360,583   12/1967   Hall et al. _____ 260—681

DELBERT E. GANTZ, Primary Examiner

G. E. SCHMITKONS, Assistant Examiner

PO-1050
(5/69)

UNITED STATES PATENT OFFICE
CERTIFICATE OF CORRECTION

Patent No. 3,494,976          Dated      Feb. 10, 1970

Inventor(s)     Joe T. Kelly, David W. Hall

It is certified that error appears in the above-identified patent and that said Letters Patent are hereby corrected as shown below:

Col. 2, line 69 - "carbodundum" should read --carborundum--

Col. 3, line 46 - "vapoh" should read --vapor--

Col. 3, line 47 - "operation" should read --operations--

Col. 5, line 11 - "6.9 g." should read --66.9 g.--

Col. 5, line 55 - "produce" should read --product--

Col. 5, line 58 - "9-20%" should read --0.20%--

Col. 5, line 52 - "residuel" should read --residual--

SIGNED AND
SEALED
JUL 21 1970

(SEAL)
Attest:

Edward M. Fletcher, Jr.
Attesting Officer

WILLIAM E. SCHUYLER, JR.
Commissioner of Patents